US011021233B2

(12) United States Patent
Bekircan et al.

(10) Patent No.: US 11,021,233 B2
(45) Date of Patent: Jun. 1, 2021

(54) ACTUATOR ROD ASSEMBLY FOR A BLADE PITCH CONTROL SYSTEM

(71) Applicant: Claverham Limited, Solihull (GB)

(72) Inventors: Suat Bekircan, Bath (GB); Paul Brewer, Bristol (GB); Reg Raval, Somerset (GB)

(73) Assignee: CLAVERHAM LIMITED, Bristol (GB)

( * ) Notice: Subject to any disclaimer, the term of this patent is extended or adjusted under 35 U.S.C. 154(b) by 49 days.

(21) Appl. No.: 16/411,641

(22) Filed: May 14, 2019

(65) Prior Publication Data

US 2019/0359316 A1 Nov. 28, 2019

(30) Foreign Application Priority Data

May 23, 2018 (EP) .................................... 18275067

(51) Int. Cl.
| | |
|---|---|
| *B64C 11/06* | (2006.01) |
| *B64C 11/30* | (2006.01) |
| *F03D 1/06* | (2006.01) |
| *F03D 7/02* | (2006.01) |
| *F03D 7/04* | (2006.01) |
| *B64D 27/00* | (2006.01) |

(52) U.S. Cl.
CPC ............ *B64C 11/06* (2013.01); *B64C 11/306* (2013.01); *F03D 1/0675* (2013.01); *F03D 7/0224* (2013.01); *F03D 7/041* (2013.01); *B64D 2027/005* (2013.01); *F05B 2260/79* (2013.01); *F05B 2270/328* (2013.01)

(58) Field of Classification Search
CPC ...... F03D 1/0675; F03D 7/041; F03D 7/0224; B64C 11/06; B64C 11/306; B64C 27/605; B64D 2027/005; F16D 2125/70; F05B 2260/79; F05B 2270/328
See application file for complete search history.

(56) References Cited

U.S. PATENT DOCUMENTS

| | | | | |
|---|---|---|---|---|
| 2,604,949 | A | * 7/1952 | McDonald | .............. B64C 27/82 |
| | | | | 416/121 |
| 3,532,302 | A | 10/1970 | Dean | |
| 5,597,138 | A | * 1/1997 | Ariton | ..................... A63H 27/12 |
| | | | | 244/17.13 |
| 9,365,289 | B2 | 6/2016 | Prud'Homme-Lacroix et al. | |
| 2015/0246725 | A1 * | 9/2015 | Reilly | ..................... B64C 11/32 |
| | | | | 244/92 |
| 2017/0174355 | A1 | 6/2017 | Waltner et al. | |

FOREIGN PATENT DOCUMENTS

| | | |
|---|---|---|
| CN | 204197275 U | 3/2015 |
| DE | 19944412 A1 | 4/2001 |
| FR | 1457332 A | 11/1966 |

OTHER PUBLICATIONS

Extended European Search Report for International Application No. 18275067.9 dated Sep. 10, 2018, 8 pages.

* cited by examiner

*Primary Examiner* — Igor Kershteyn
(74) *Attorney, Agent, or Firm* — Cantor Colburn LLP

(57) ABSTRACT

An actuator rod assembly for a blade pitch control system is provided herein. The actuator rod assembly includes a tubular outer rod and an inner rod. The outer rod has a first end and a second end. The inner rod has a first end and a second end and extends through the tubular outer rod. The inner rod is tensioned against the tubular outer rod so as to place the outer rod in compression.

15 Claims, 5 Drawing Sheets

ACTUATOR ROD ASSEMBLY FOR A BLADE PITCH CONTROL SYSTEM

FOREIGN PRIORITY

This application claims priority to European Patent Application No. 18275067 filed May 23, 2018, the entire contents of which is incorporated herein by reference.

TECHNICAL FIELD

The present disclosure relates to actuator rod assemblies for blade pitch control systems.

BACKGROUND

Actuator rods are used to transfer movement from an actuator to an object of actuation. One application is in the pitch control system for a helicopter tail rotor Most helicopters, as is known, include a tail rotor which provides a reaction torque to counter the torque produced by a main rotor. Varying the thrust of the tail rotor allows the helicopter to yaw in both directions and maintain yaw stability. To change the thrust of the tail rotor, the pitch of the tail rotor blades is changed. Rather than controlling the pitch of each blade individually, a spider linkage is commonly included which can simultaneously change the pitches of all the blades. The spider linkage is fixed to a pitch control rod (or actuator rod), which in turn is connected to an actuator. Thus, linear displacement of the actuator controls all the blade pitches through the pitch control rod.

Actuator rods are also used in many other applications, including other pitch control systems, for example in wind turbines.

Examples of pitch control rod arrangements for a helicopter tail rotor are disclosed in U.S. Pat. Nos. 3,532,302, 9,365,289 B and US 2017/0174355 A1

The actuator rod in a helicopter tail rod assembly, as well as in some other applications is a safety-critical piece. If the rod fails, control of the yaw of the helicopter will be lost.

Actuator rods are commonly formed as a single piece. Rods may fail, for example due to fatigue failure due to cyclic loads. Rods made of a single piece have no intrinsic fail-safe mechanism.

SUMMARY

From a first aspect there is provided an actuator rod assembly for a blade pitch control system. The actuator rod assembly includes a tubular outer rod and an inner rod. The outer rod has a first end and a second end. The inner rod has a first end and a second end, extends through the tubular outer rod. The inner rod is tensioned against the outer rod so as to place the outer rod in compression.

The assembly may include an indicator washer frictionally clamped in a load path between the inner and outer rods, so as to be rotationally fixed when the inner rod is tensioned and rotationally released when the tension is lost, for example due to failure of the inner rod.

The indicator washer may have an outer peripheral surface that is knurled or is provided with features to facilitate gripping by a user.

The inner and outer rods may be keyed to each other at the respective second ends to prevent relative rotation therebetween.

The assembly may include an anti-rotation washer having respective first keying formations keying with respective second keying formations on the inner and outer rods.

The first keying formations may be axially projecting keying formations. Each of the second keying formations may be a slot in the respective inner or outer rod.

The second end of the inner rod may include an enlarged head for cooperation with an end face of the outer rod.

A lock nut may be threadedly mounted to the first end of the inner rod for creating a tension in the inner rod.

A cup lock washer may be arranged around the lock nut to secure the lock nut.

An or the indicator washer may be arranged between the lock nut and the first end of the outer rod.

The inner rod may be waisted in a longitudinally central portion thereof.

The inner rod may be made from high strength steel.

From another aspect, there is provided a pitch control mechanism for a blade assembly including at least one, for example at least two rotor blades; a linkage linked to the at least one rotor blade for controlling the pitch thereof; the actuator rod assembly as described above attached to the linkage at the second end of the outer rod; and an actuator for driving the actuator rod assembly.

The actuator may be a hydraulic, electrical or mechanical actuator.

From yet another aspect, there is provided a helicopter tail rotor system, including the pitch control mechanism as described above, wherein the at least one rotor blade is a rotor blade of a helicopter tail rotor and the linkage is a spider linkage.

From a yet further aspect, the disclosure provides a method of repairing an actuator rod assembly in accordance with the disclosure comprising replacing a fractured outer rod or inner rod with a new outer rod or inner rod.

BRIEF DESCRIPTION OF DRAWINGS

Various embodiments of this disclosure will now be described by way of example only, with reference to the accompanying drawings in which.

Like reference numerals are used for like components in all of the drawings.

DETAILED DESCRIPTION

Figure 1:
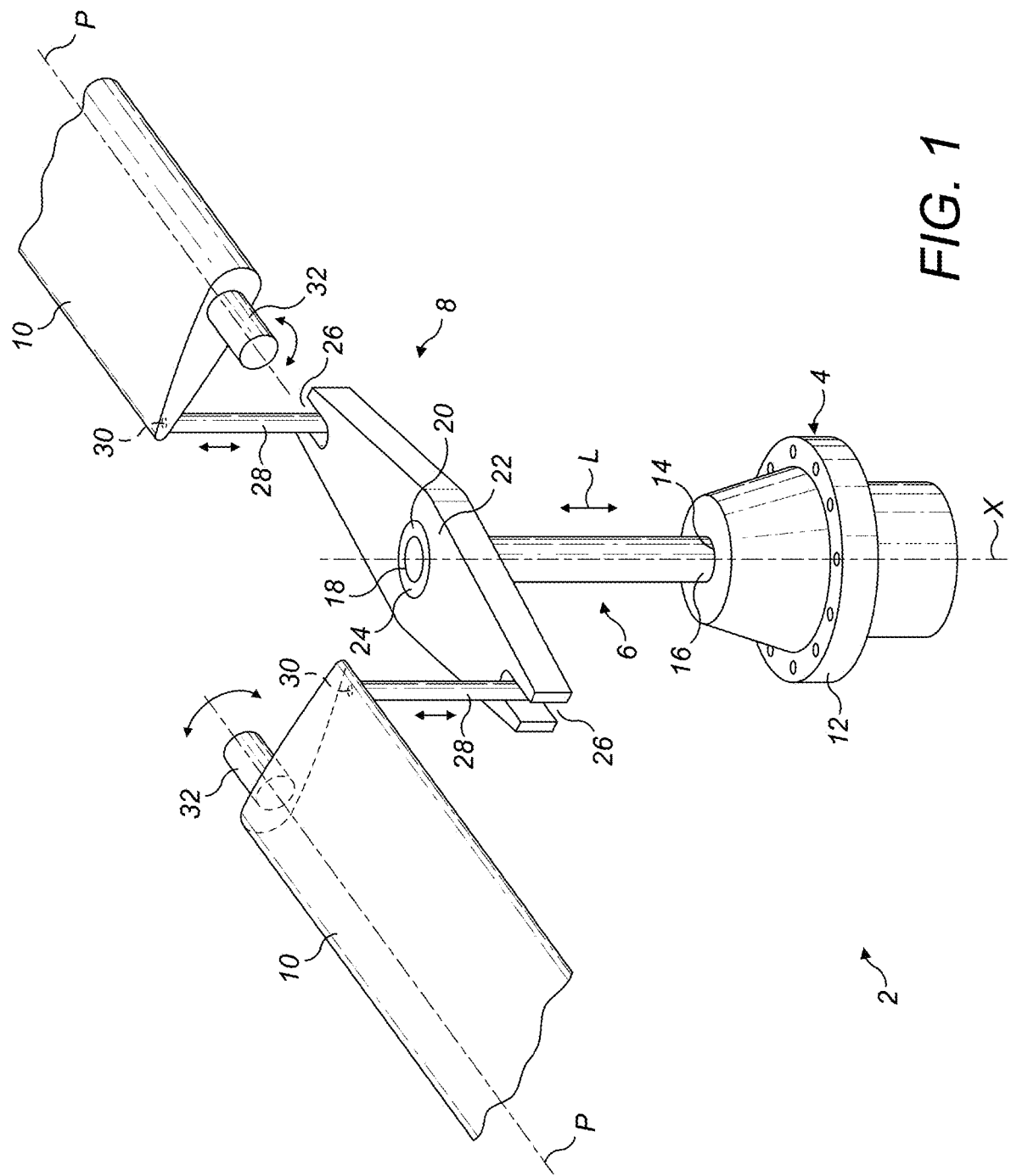
FIG. 1 shows a blade pitch control system for a helicopter tail rotor in accordance with this disclosure.

With reference to FIG. 1 an embodiment of a blade pitch control system 2 is illustrated.

The blade pitch control system 2 includes an actuator 4, an actuator rod 6, a linkage 8 and at least one rotor blade 10.

The actuator 4 may be a hydraulic, electrical or mechanical actuator or any other type of actuator as is known in the art. The actuator 4 may include a mounting flange 12 for mounting to a fixed structure, such as a body of a helicopter (not shown). The actuator 4 may include a bore 14 into which the actuator rod 6 is received.

The actuator 4 may selectively drive the actuator rod 6 backwards and forwards in a linear direction L.

The actuator rod 6, which will be described further below with reference to FIGS. 3 to 5, has a first rod end 16 and a second rod end 18. The first rod end 16 is connected to the actuator 4, and is received in the bore 14 of the actuator 4. The second rod end 18 is connected to the linkage 8. The system 2 may comprise a bearing 20 at the location where the linkage 8 is connected to the second rod end 18.

The linkage 8 may be configured as a spider linkage 8. The spider linkage 8 may, as is known in the art, comprise a body 22 with a central bore 24 and notches 26 at the periphery of the body 22. The central bore may include the bearing 20, arranged such that the body can rotate around an axis X of the actuator rod 6. The spider linkage 8 also includes pitch links 28 connected to respective notches 26. The pitch links 28 extend from the body 22 towards a respective blade 10, in a direction parallel to the axis X and away from the actuator 4.

Each rotor blade 10 includes an attachment portion 30 where the blades 10 are attached to respective pitch links 28. The attachment portion 30 may, as shown, be at the trailing edge of the rotor blade 10. Each rotor blade 10 may have a blade pitch axis P about which they can rotate so as to change a pitch of the blade 10. This rotation is caused by movement of the attachment portion 30, which is caused by movement of the pitch links 28, caused by movement of the spider linkage 8, caused by movement of the actuator rod 6, actuated by the actuator 4. Each rotor blade 10 may comprise a rotor shaft 32, mounted to a rotor head (not shown).

In the embodiment shown there are two rotor blades 10. However, it is envisaged that an alternative blade pitch control system may include more than two rotor blades 10.

Figure 2:
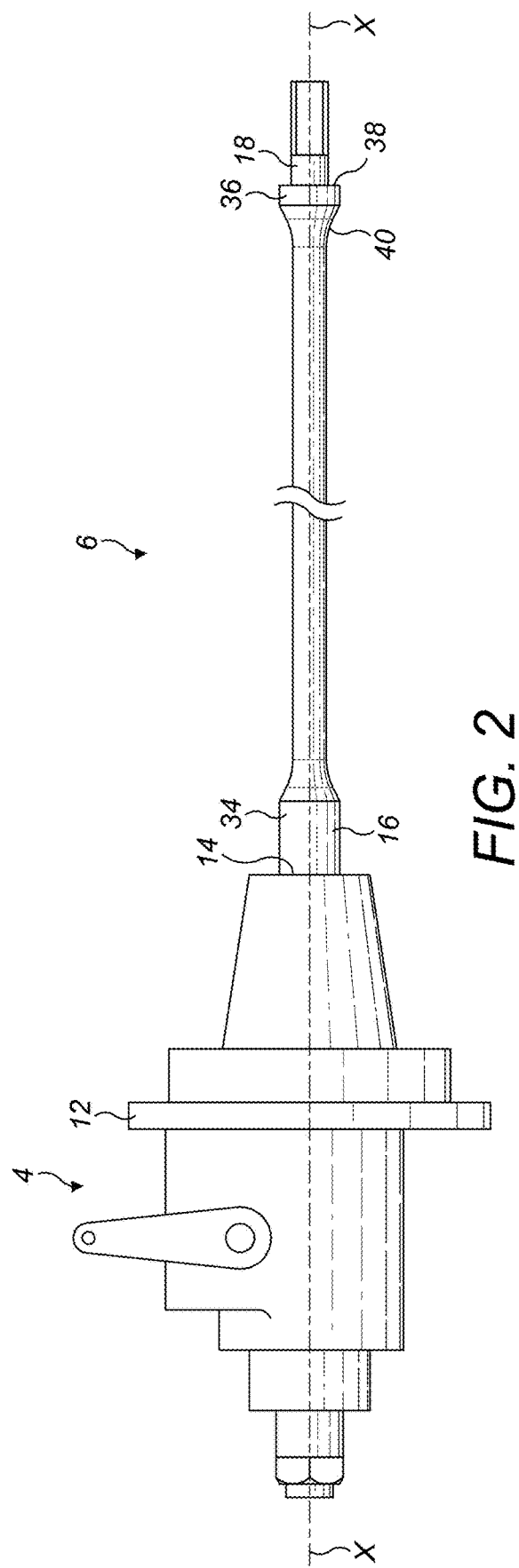
FIG. 2 shows a side view of a prior art pitch control rod.

With reference to FIG. 2, a prior art actuator 4 and actuator rod 6 are shown. The actuator rod 6 includes a portion 34 at the first rod end 16 received in the actuator 4 and a shoulder 36 having an axially facing surface 38 at the second rod end 18 for engagement with the linkage 8. The rod 6 may be tapered at a portion 40 on the side of the shoulder 36 facing toward the actuator 4.

Figure 3:
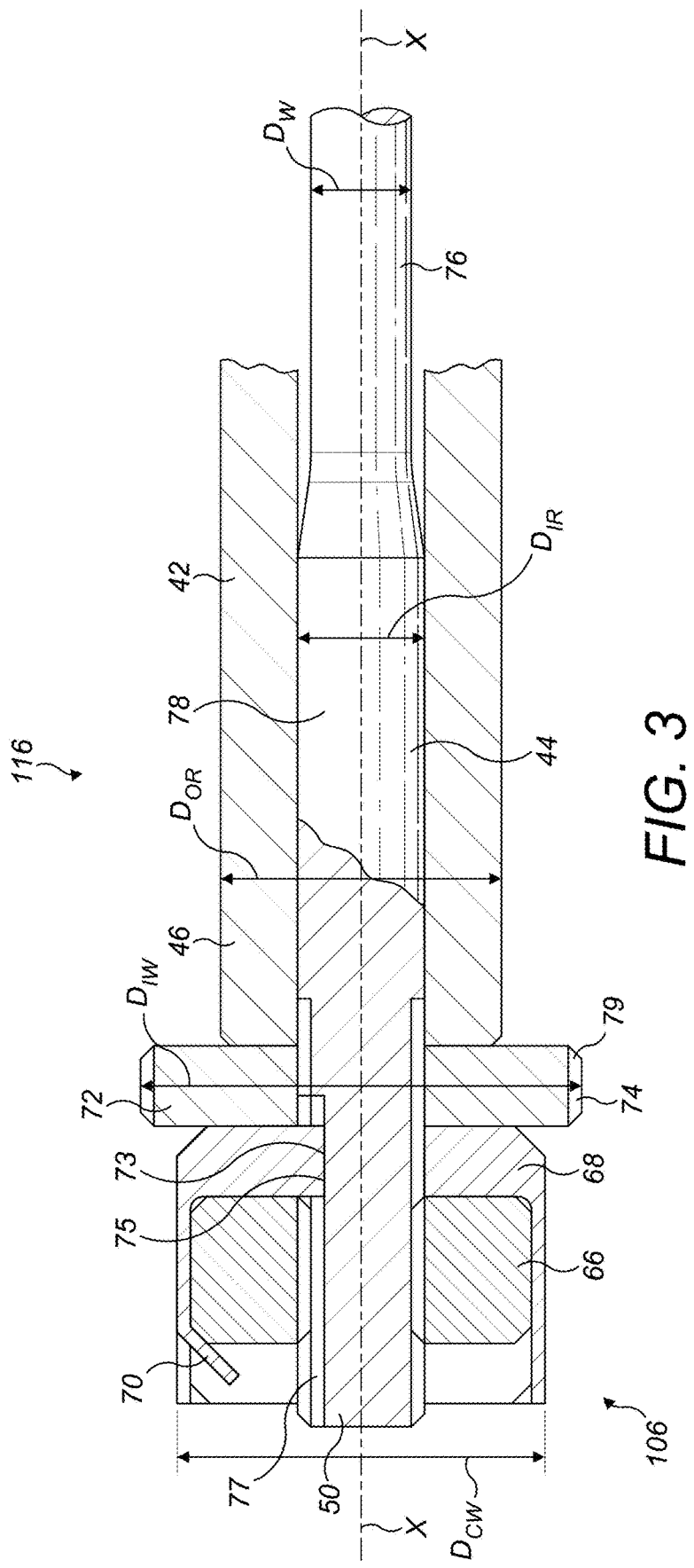
FIG. 3 shows a side view of the actuator end of an actuator rod assembly in accordance with this disclosure.
Figure 4:
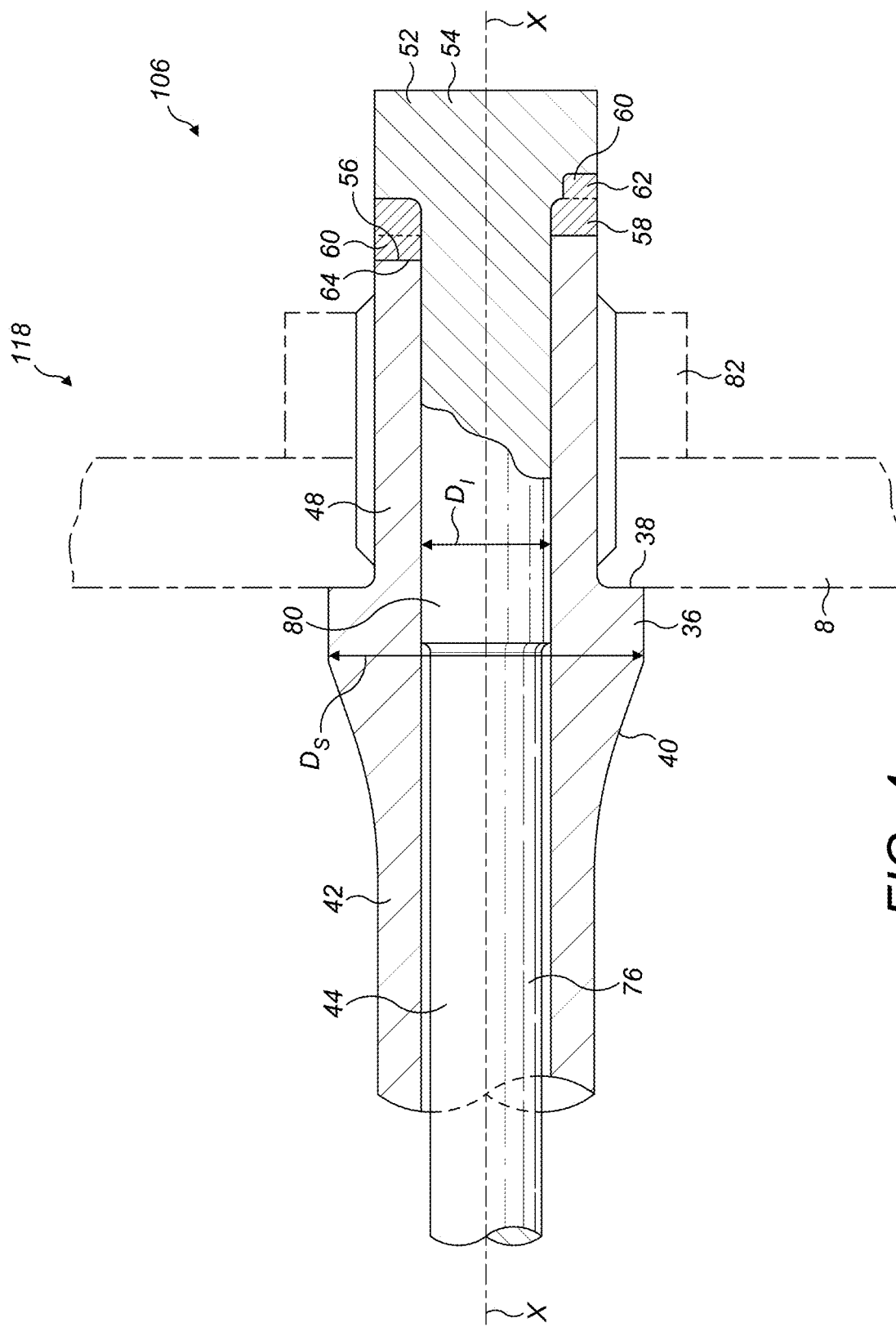
FIG. 4 shows a side view of the tail rotor end of the actuator rod of FIG. 3.
Figure 5:
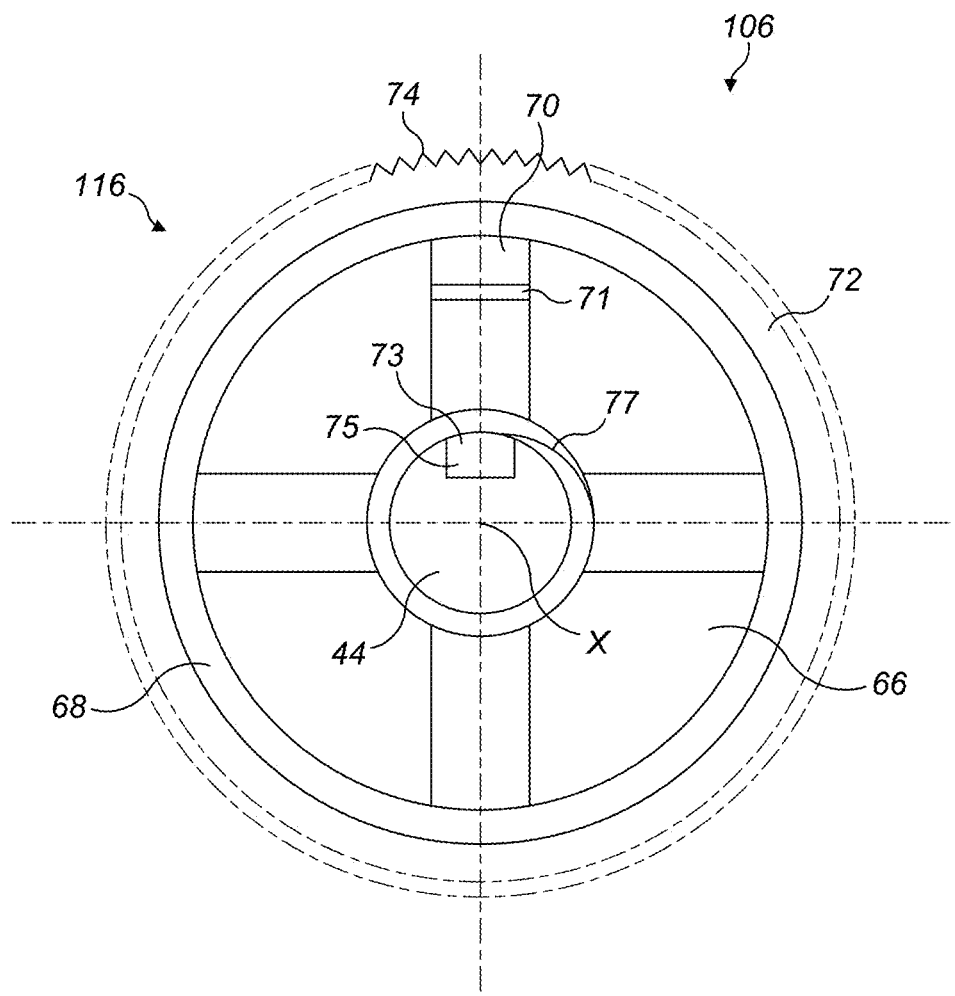
FIG. 5 shows an end view of the actuator rod of FIG. 3 from the actuator end.

With reference to FIGS. 3 and 4, an embodiment of an actuator rod assembly 106 is illustrated. The actuator rod assembly 106 includes a tubular outer rod 42 and an inner rod 44.

The outer rod 42 may be provided with a suitable formation (for example a flange or lug not shown) for cooperation with the actuator 4 to transmit an actuating movement to the outer rod 42.

The inner rod 44 extends through the outer rod 42. The outer rod 42 has a first end 46 and a second end 48. The inner rod 44 has a first end 50 and a second end 52. The first ends 46, 50 of the inner and outer rods 44, 42 are arranged at a first end 116 of the actuator rod assembly 106 and the second ends 48, 52 of the inner and outer rods 44, 42 are arranged at a second end 118 of the actuator rod assembly 106. The inner rod 44 is tensioned against the outer rod 42 such that the outer rod 42 is placed in compression, as will be described further below.

The second end 52 of the inner rod 44 includes an enlarged head 54 and the second end 48 of the outer rod 42 includes an end face 56. The enlarged head 54 and end face 56 cooperate with one another to allow tensioning of the inner rod 44 as will be described further below. As illustrated, a washer 58 may be interposed between the enlarged head 54 and the end face 56.

In embodiments of the disclosure, the inner rod 44 and the outer rod 42 may be keyed to one another at their respective second ends 52, 48 so as to prevent relative rotation between the inner and outer rods 44, 42. Keying formations may therefore be formed on the enlarged head 54 of the inner rod 44 and the end face 56 of the outer rod 42. In the embodiment illustrated, however, the washer 58 is formed as an anti-rotation washer 58 having respective first keying formations 60 keying with respective second keying formations 62, 64 on the inner and outer rods 44, 42.

A lock nut 66 is threadedly mounted to the first end 50 of the inner rod 44. The lock nut 66, when tightened against the first end 46 of the outer rod 42 will, by virtue of the enlarged head 54 of the inner rod 44 cooperating with the end face 56 of the outer rod 42, create a tension in the inner rod 44. The anti-rotation washer 58 and keying formations 60, 62, 64 allow for the lock nut 66 to be tightened. The tension in the inner rod 44 places the outer rod 42 in compression.

A cup lock washer 68 may be arranged around the lock nut 66 to secure the lock nut 66. The cup lock washer 68 may include a tab 70 which may be bent over the lock nut 66 into a slot 71 in the lock nut 66 after the inner rod 44 is tensioned by tightening the lock nut 66 to aid in securing the lock nut 66. This is illustrated in FIG. 5.

The cup lock washer 68 is keyed to the inner rod 44 so as not to be capable of rotation relative thereto. The cup lock washer 68 may therefore have a key 73 which engages with a keyway 75 formed on a threaded portion 77 of the first end 50 of the inner rod 44.

An indicator washer 72 is arranged between the lock nut 66 and the first end 46 of the outer rod 42. The indicator washer 72 has an exposed outer peripheral surface 74, which may be knurled or may be formed with features 79 to facilitate gripping by a user. It will be understood that when the lock nut 66 is tightened, the indicator washer 72 will be frictionally clamped between the cup lock washer 68 and the first end 46 of the outer rod 42, i.e. in the load path between the inner and outer rods 44, 42. When the lock nut 66 is tightened to the extent required to provide the desired pretensioning of the inner rod 44, the frictional clamping will prevent rotation of the indicator washer 72. However, when tension in the inner rod 44 is lost, for example due to failure of the inner rod 44, the clamping will be released and the indicator washer will 72 be rotatable. A user can therefore determine whether failure has occurred by attempting to turn the indicator washer 72. If the indicator washer 72 turns, the inner rod 44 has failed and the actuator rod assembly 106 must be repaired. If the indicator washer 72 does not turn, the actuator rod assembly 106 is safe for use.

As shown, the diameter $D_{IW}$ of the indicator washer 72 may be larger than the diameter $D_{CW}$ of the cup lock washer 68 and the diameter $D_{OR}$ of the outer rod 42 in order to facilitate its manipulation by a user. Also, while the outer peripheral surface 74 of the indicator washer 72 is knurled, other features, for example grooves, coatings etc. may be provided to facilitate manipulation of the indicator washer.

The inner rod 44 may be waisted in a longitudinally central portion 76 thereof. Thus the longitudinally central portion 76 may have a diameter $D_W$ that is slightly smaller than an internal diameter $D_{IR}$ of the outer rod 42. In one example the waisted diameter $D_W$ may be about 10% smaller than the internal diameter $D_{IR}$. The inner rod 44 may also include end portions 78, 80 at the respective first and second ends 50, 52 of the inner rod 44 that have a diameter $D_I$ substantially equal to the internal diameter $D_{IR}$ of the outer rod 42. These equal diameters $D_I$, $D_{IR}$ ensure that the inner rod 44 is centred within the outer rod 42. The arrangement with a waisted central portion reduces the likelihood of excessive contact between the inner and outer rods 44, 42 during assembly of the actuator rod assembly 106, which may create surface fractures, which would in turn reduce the durability of the assembly 6 when under cyclical loads that lead to fatigue stresses.

As shown in the embodiment in FIG. 4, and similarly to the prior art actuator rod 6 in FIG. 2, the outer rod 42 includes a shoulder 36 at the second end 48 thereof. The shoulder 36 is an annular portion around the outer rod 42 with a flat surface 38 on the side facing away from the actuator 4. The diameter of the outer rod is tapered at a portion 40 on the side of the shoulder 36 facing toward the actuator 4, such that the shoulder 36 has a diameter $D_S$ larger than the outer rod diameter $D_{OR}$. The linkage 8 abuts the flat surface 38 of the shoulder 36 and may be secured thereto by a linkage lock nut 82, which may be threadedly engaged with the outer rod 42. As described in reference to FIG. 1, a bearing 20 may also be arranged with the linkage 8 and the actuator rod assembly 6.

The inner rod 44 and outer rod 42 may be made from steel, for example high strength steel.

The inner rod 44 may easily be assembled to the outer rod 42 by insertion through the second end 48 of the outer rod 42.

In use, the actuator rod assembly 106 described herein provides an intrinsic fail-safe mechanism. If the outer rod 42 fails, for example experiencing one or more fractures from fatigue stresses, the inner rod 44 will continue to perform the function of the actuator rod assembly 6 for a time, such as for a helicopter to finish a journey and land safely so that the actuator rod assembly 106 can be repaired. The tension in the inner rod 44, together with the keying formations 60, 62, 64, will act to maintain the correct alignment of the fractured outer rod ends in the event of a crack failure. Because the fractured ends of the outer rod 42 are aligned, the outer rod 42 is still able to support compressive loads. There will normally be no torque loading applied to the assembly during operation to cause the fractured ends of the outer rod 42 to rotate out of alignment. Additionally, the fractured end surfaces may act as keys to prevent relative rotation of the fractured parts. The lock nut 66 and enlarged head 54 of the inner rod 44 maintain the outer rod 42 in place after failure.

The fail-safe mechanism being inside the outer rod 42 overcomes the need for external fail safe features, which would take up more space in an actuated arrangement.

The indicator washer 72 can be used to determine whether the rod has failed, without a need for detailed inspection of the whole actuator rod assembly 106, which may not even be possible without disassembly of some parts of the actuator rod assembly 106. An operator may simply check before a flight whether the indicator washer 72 can be turned. If it cannot, the actuator rod assembly 106 is intact; if it can, the actuator rod assembly has failed and requires attention.

The embodiment described above may exhibit a number of advantages over the prior art one-piece construction. It provides for an actuator load path capability in the event of a pitch rod failure thus enabling safe, continued operation of the helicopter. It also provides an actuator rod which has increased tolerance to fatigue failure caused by cyclic loads, as the outer rod 42 is placed in compression by the inner rod 44. It may further provide improved component reliability and safety. Also, it may not require significant additional space, as the prior art rod 6 generally comprises a central bore. The inner rod 44 may be provided through that bore. Also, as discussed above, it allows for an easy pre-flight check facility to ensure rod integrity.

In addition, should the inner rod 44 or outer rod 42 fail, the assembly may easily be repaired by simply replacing the failed rod.

It will be appreciated that the above description is of a particular embodiment and that modifications may be made to the embodiments without departing from the scope of the disclosure. For example, while the inner rod 44 has been shown with an enlarged head 56, both ends of the inner rod 44 (rather than just one end as shown) may be provided with threads for receiving a locknut/washer for tensioning the inner rod 44.

Also, while the actuator rod assembly 106 has been described in the context of a helicopter pitch control mechanism, it will be understood that it may be used in a wide variety of applications such as other pitch control mechanisms, for example for wind turbines. In fact, it may be advantageously used in any safety critical application where fracture of an actuator rod may have grave consequences.

The invention claimed is:

1. An actuator rod assembly for a blade pitch control system comprising:
a tubular outer rod with a first end and a second end;
an inner rod, with a first end and a second end, extending through the tubular outer rod;
wherein the inner rod is axially tensioned against the outer rod so as to place the outer rod in axial compression; and
an indicator washer frictionally clamped in a load path between the inner and outer rods, so as to be rotationally fixed when the inner rod is tensioned and rotationally released when the tension is lost due to failure of the inner rod.

2. The actuator rod assembly of claim 1, wherein the indicator washer has an outer peripheral surface that is knurled or is provided with features to facilitate gripping by a user.

3. The actuator rod assembly of claim 1, wherein the inner and outer rods are keyed to each other at the respective second ends to prevent relative rotation therebetween.

4. The actuator rod assembly of claim 3, comprising an anti-rotation washer having respective first keying formations keying with respective second keying formations on the inner and outer rods.

5. The actuator rod assembly of claim 4, wherein the first keying formations are axially projecting keying formations and each of the second keying formations is a slot in the respective inner or outer rod.

6. The actuator rod assembly of claim 1, wherein the second end of the inner rod comprises an enlarged head for cooperation with an end face of the outer rod.

7. The actuator rod assembly of claim 1, wherein a lock nut is threadedly mounted to the first end of the inner rod for creating a tension in the inner rod.

8. The actuator rod assembly of claim 7, wherein a cup lock washer is arranged around the lock nut to secure the lock nut.

9. The actuator rod assembly of claim 7, wherein an or the indicator washer is arranged between the lock nut and the first end of the outer rod.

10. The actuator rod assembly of claim 1, wherein the inner rod is waisted in a longitudinally central portion thereof.

11. The actuator rod assembly of claim 1, wherein the inner rod is made from high strength steel.

12. A pitch control mechanism for a blade assembly comprising:
at least one rotor blade;
a linkage linked to the at least one rotor blade for controlling the pitch thereof;

the actuator rod assembly of claim 1 attached to the linkage at the second end of the outer rod; and an actuator for driving the actuator rod assembly.

13. A pitch control mechanism of claim 11, wherein the at least one rotor blade is a rotor blade of a helicopter tail rotor and the linkage is a spider linkage.

14. A method of repairing an actuator rod assembly as claimed in claim 1, comprising replacing a fractured outer rod or inner rod with a new outer rod or inner rod.

15. An actuator rod assembly for a blade pitch control system comprising:

a tubular outer rod with a first end and a second end;

an inner rod, with a first end and a second end, extending through the tubular outer rod;

wherein the inner rod is axially tensioned against the outer rod so as to place the outer rod in axial compression;

an indicator washer frictionally clamped in a load path between the inner and outer rods, so as to be rotationally fixed when the inner rod is tensioned and rotationally released when the tension is lost due to failure of the inner rod; and a lock nut threadedly mounted to the first end of the inner rod;

wherein the second end of the inner rod comprises an enlarged head for cooperation with an end face of the outer rod.

\* \* \* \* \*